United States Patent
Ringger et al.

(10) Patent No.: US 7,496,437 B2
(45) Date of Patent: Feb. 24, 2009

(54) PROTECTIVE DEVICE FOR A VEHICLE

(75) Inventors: Klaus Ringger, Nuertingen (DE); Frank Schou, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 95 days.

(21) Appl. No.: 10/520,973

(22) PCT Filed: Feb. 20, 2003

(86) PCT No.: PCT/DE03/00523

§ 371 (c)(1),
(2), (4) Date: Jun. 9, 2005

(87) PCT Pub. No.: WO2004/007248

PCT Pub. Date: Jan. 22, 2004

(65) Prior Publication Data
US 2005/0231386 A1    Oct. 20, 2005

(30) Foreign Application Priority Data
Jul. 11, 2002    (DE) .................... 102 31 363

(51) Int. Cl.
*B60R 21/16* (2006.01)
*G08G 1/01* (2006.01)
(52) U.S. Cl. .................. 701/45; 180/271; 280/735; 340/933
(58) Field of Classification Search .............. 701/45; 180/271, 282; 280/734, 735; 340/933; 307/10.1; B60R 21/16; G08G 1/01
See application file for complete search history.

(56) References Cited

U.S. PATENT DOCUMENTS

| 5,181,011 | A | * | 1/1993 | Okano ................... 340/438 |
| 5,513,878 | A | * | 5/1996 | Ueda et al. ............... 280/735 |
| 5,570,903 | A | * | 11/1996 | Meister et al. ........... 280/735 |
| 5,677,838 | A | * | 10/1997 | Itou et al. ................ 701/29 |
| 5,779,264 | A | * | 7/1998 | de Mersseman et al. .... 280/735 |
| 6,045,156 | A |   | 4/2000 | Lyons et al. ............. 280/735 |
| 6,125,313 | A | * | 9/2000 | Watanabe et al. ......... 701/45 |
| 6,363,307 | B1 | * | 3/2002 | Ikegami .................. 701/45 |
| 6,628,007 | B1 | * | 9/2003 | Baumgartner ........... 307/10.1 |
| 2001/0001522 | A1 | * | 5/2001 | Mai et al. ................ 280/735 |
| 2002/0103590 | A1 | * | 8/2002 | Schondorf et al. ........ 701/45 |
| 2004/0045760 | A1 | * | 3/2004 | Baumgartner et al. ..... 180/282 |

FOREIGN PATENT DOCUMENTS

| DE | 198 11 182 | 9/1999 |
| DE | 199 09 403 | 9/2000 |
| DE | 199 60 179 | 6/2001 |

* cited by examiner

*Primary Examiner*—Tuan C To
(74) *Attorney, Agent, or Firm*—Kenyon & Kenyon LLP

(57) ABSTRACT

A protective device for a vehicle is described which is deactivatable by a switch, the state of the switch being analyzable by a processor in a control unit and by an independent hardware path. The independent hardware path has at least one logic module which makes the setting of delay times highly flexible.

10 Claims, 2 Drawing Sheets

PROTECTIVE DEVICE FOR A VEHICLE

FIELD OF THE INVENTION

The present invention is directed to a protective device for a vehicle.

BACKGROUND INFORMATION

A safety device for motor vehicles is described in German Published Patent Application No. 199 60 179. The motor vehicle has one airbag or multiple airbags in this case which can be deactivated via a switching arrangement. The switching arrangement is configured here in the form of a deactivation switch.

SUMMARY OF THE INVENTION

A protective device for a vehicle according to an exemplary embodiment of the present invention, in addition to analyzing the switch position using a processor, another module for analyzing the switch position which may function independently from the processor. A hardware redundancy may thereby be established. For its function, this module may have at least one logic module. Delay times and hold times of any length may be provided for the module's logic state time-variant approaches by using such logic modules. Tolerances may now be irrelevant due to the use of logic modules. Long delay times and hold times of a few hundred milliseconds may be implementable due to the use of logic modules.

The measures and refinements cited in the dependent claims make advantageous improvements on the protective device for a vehicle cited in the independent claim possible.

The at least one logic module may be configured as a gate and/or as a flip-flop. To determine the particular length of the delay times and hold times of the module's logic state possible, a combination of different gates and flip-flops may be provided. Thus, freeze-in of the logic result may be provided.

Furthermore, the at least one logic module may be configured so that a time response of the logic module's logic state is variable. This may be carried out, for example, via the processor, which, however, may exert no influence on the module's analysis of the signal from the switch. The time response refers to the delay times and the hold times of the logic state.

Furthermore, the switch may be configured either as a resistor network or as at least one Hall sensor. These may be two reliable circuit concepts for a switch.

In addition, the power supply of the switch may be provided either from the control unit, e.g., for the restraint systems, i.e., the protective device, or that an external power supply of the switch may made be available to make a direct connection to the vehicle battery.

Finally, an AND gate may be provided, gating together a signal of the module and a signal of the processor, so that only in the case of a logic 1 of both inputs is a new output signal of the module relayed.

DETAILED DESCRIPTION

Figure 1:
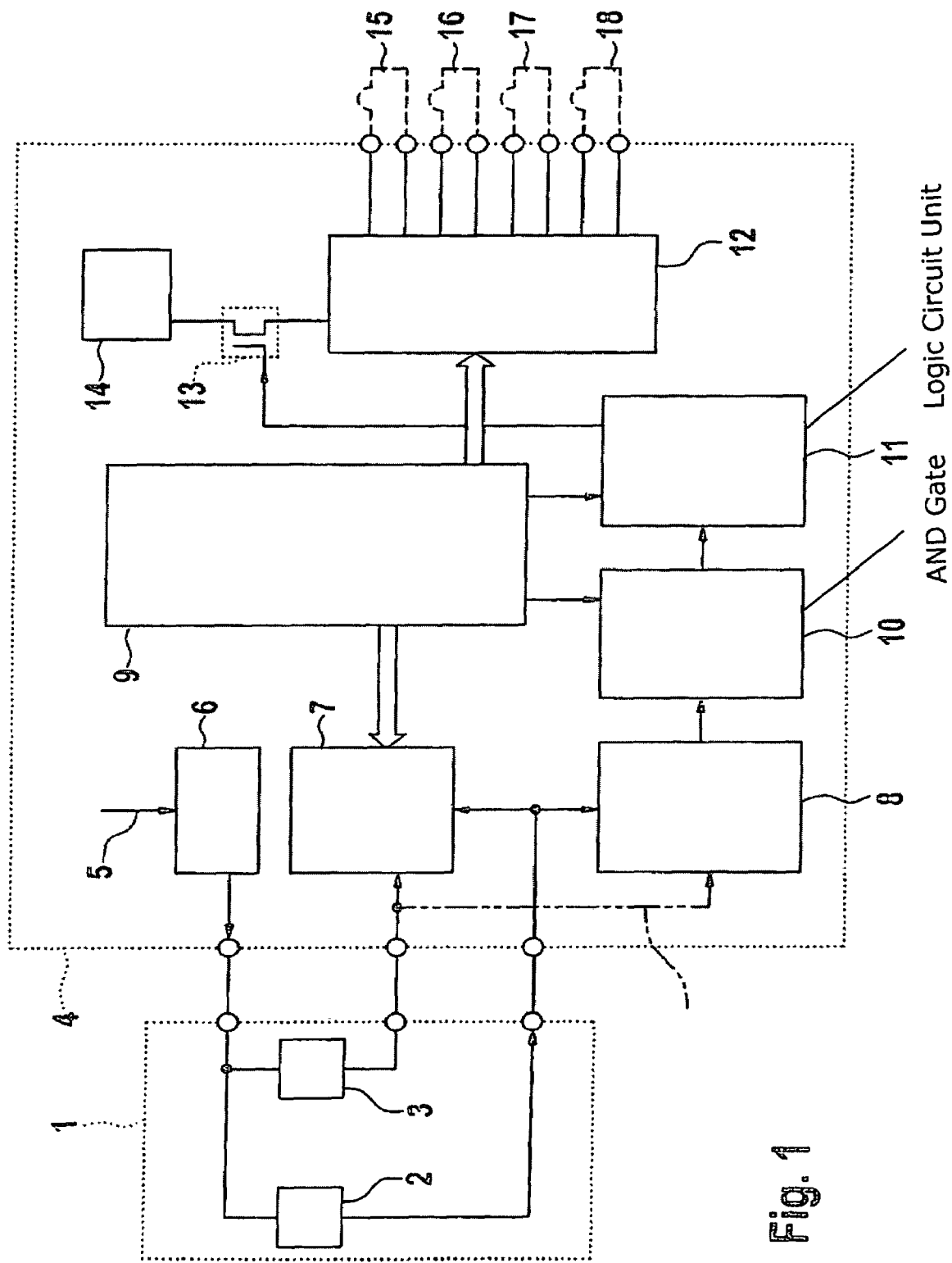
FIG. 1 shows a first block diagram of the protective device according to an exemplary embodiment of the present invention.

In today's vehicles the passenger-side airbag or the rear side airbags may be deactivated using a switch, i.e., an airbag deactivation switch. For this purpose, the position of a key switch, for example, may be analyzed by the airbag control unit. Different concepts may be provided for implementing the switch. Switches, having resistor networks where the switch switches between two different resistor dividers, and switches made up of one or two Hall sensors may be used. These may be switched without contact, which may result in high mechanical robustness.

Since the airbag deactivation function may be safety-critical, the analysis in the airbag control unit may be configured to be redundant. Analysis of the switch position and activation or deactivation of the airbag(s) may be carried out via software and via a hardware path may be independent from the microcontroller. Depending on the switch position, the hardware path or module may additionally activate or deactivate the respective restraining arrangement—triggering circuits for airbags, seatbelt tensioning devices, or other restraining arrangements such as, for example, an electromagnetic valve for a roll bar—via the hardware, thereby ensuring that erroneous triggering of the respective triggering circuits may not occur, even in the event of a defective microcontroller.

The required hardware path or modules may require the performance of the following functions:
  Analyzing the signal lines of the deactivation switch.
  Filtering the signals.
  Processing the signals.
  Detecting and handling errors, i.e., a defect in the switch, interruption of the battery supply.
  Determining default states after switch-on.
  Defining the time response: timeouts, hold times, and delays.
  Activating or deactivating the defined triggering circuits via hardware intervention.
  Responding to switch-off of the airbag control unit. Attention should be paid to the feature that, after the battery supply is switched off, the control unit may still draw power for some time from its own power reserve.

The module in the airbag control unit may be implemented as discrete circuits having operational amplifiers and/or comparators for processing the respective input signals of the airbag deactivation switches, and for triggering suitable activation circuits and deactivation circuits.

Activation and deactivation of the restraining arrangement may take place in different ways:
  Switching on and off the supply voltage of the respective triggering circuit IC's.
  Switching on and off the trigger voltage supply for the respective triggering circuits.
  Interrupting the triggering circuits, shorting the triggering circuits to ground, or shorting the ignitor.
  Intervening in the logic control of the triggering circuits, in or at the triggering circuit IC.

Signal filtering and time response of the circuit during normal operation, as well as in the event of an error, may be implemented by suitable circuit elements. RC elements may be provided here, but they have undesired features, including, for example time invariance (e.g., only a certain time response may be provided), it may not be possible to differentiate between different operating states; there may be relatively great tolerances; dimensioning, availability, and the size of resistors and capacitors may be limited, and in particular, delay times and hold times longer than a few hundred milliseconds may be difficult to implement.

According to an exemplary embodiment of the present invention, the redundant hardware path may be implemented by using logic modules. Such logic modules may include gates and flip-flops, i.e., multivibrator circuits. These may make it possible to achieve time-variant approaches with delay times and hold times of any length. The microcontroller or processor may assume the time control of the logic modules. In this case, however, the processor may only control the time response of the module for analyzing the state of the airbag deactivation switches, but not the state of the restraining arrangement activation or restraining arrangement deactivation. This may be important to preserve the concept of redundancy.

FIG. 1 shows the protective device according to an exemplary embodiment of the present invention in a first block diagram. The protective device according to the exemplary embodiment of the present invention has an airbag deactivation switch 1 and an airbag control unit 4 which are connected to one another. Airbag deactivation switch 1 has two Hall sensors 2 and 3 which are interconnected on an electrode where they receive power from control unit 4 and a current limiter 6. Current limiter 6 itself is supplied by battery voltage 5. On the other side, Hall sensor 2 is connected to two components of control unit 4. One is a module 7 which includes the voltage supply, communication interfaces, analog inputs, and an analog-to-digital converter. The other is a module 8 which processes and analyzes the signal of Hall sensor 2. Processing of the sensor signals forks into two paths here. The digitized Hall signal is transmitted to microcontroller 9 via module 7, the microcontroller processing the signal to determine whether the deactivation switch has been operated or not. At the same time, module 8 performs the same procedure, module 8 also having access to an analog-to-digital converter in order to execute a digital analysis. The other electrode of Hall sensor 2 is also connected to module 7 and module 8 to provide redundant processing of the Hall sensor signals.

Processor 9 activates or deactivates the deployment of the restraining arrangement via software according to the switch position of deactivation switch 1. One or both Hall sensor signals are filtered and analyzed in module 8. This is followed by triggering of safety semiconductor 13 via hardware for activating or deactivating the appropriate triggering circuits. However, block 10 and block 11 are also switched between these two procedures. Block 10 enables the activation of the airbag triggering circuits as a function of the status of the deactivation switch and combines this with an additional enable signal from processor 9 to enable airbag output stages 12 by processor 9 before, in the event of a crash, deployment should indeed take place, regardless of whether the deactivation switch is in the "on" or "off" position. However, due to block 10, microcontroller 9 may activate output stages 12 via safety semiconductor 13 only when deactivation switch 1 is also in the "on" position. If deactivation switch 1 is in the "off" position, then output stages 12 are deactivated independently of the processor enabling line to block 10. Particularly in airbag control units having a DC ignition, this function may represent an additional protection against erroneous deployment in the event of defects in output stage IC 12. Alternatively, block 10 may be omitted. The output signal of block 10 is supplied to a block 11 which represents a logic circuit unit and which may be implemented using flip-flops. This block enables storage and freezing-in of the deactivation switch state. The storage is volatile, i.e., it is not preserved when the airbag control unit is switched off. Processor 9 may control whether the logic state of safety semiconductor 13 and thus the activation or deactivation of the respective airbag triggering circuits 15 through 18 is frozen, thereby becoming independent of possible changes in the switch position of deactivation switch 1, or whether each change in the switch position instantaneously results in activation or deactivation of airbag triggering circuits 15 through 18. Here again, it may be important that processor 9 is only able to freeze-in the state of safety semiconductor 13, but has no bearing on the state itself. Varied and very flexible options for controlling the analysis of deactivation switch 1 may arise from this concept of logic storage or freezing-in of the state of the hardware path, such as:

any hold times or delay times may be provided,
in the event of an error, a crash, or a power reserve problem, the state of the hardware path may be frozen,
it may be possible to control whether the state of deactivation switch 1 is read in and received only once at the start of a closing cycle, or whether a change in the switch position is permissible at any time.

As mentioned before, block 11 is connected to safety semiconductor 13, which is in turn connected to power reserve 14 and output stages 12. Power reserve 14 is normally at least one capacitor which, in the event of an interruption of the battery connection, supplies power for a certain amount of time for continued operation. Processor 9 is directly connected to output stages 12 via a data output to control the output stages via software. Output stages 12 are connected to triggering circuits 15 through 18, respectively. As described above, processor 9 itself is connected to block 10 via an enable line to establish an AND gate, as well as to block 11 to influence the time response.

Safety semiconductor 13 may be a transistor switch.

The protective device according to an exemplary embodiment of the present invention may be independent of the configuration of deactivation switch 1, i.e., it may not matter whether it is a resistor network or one or two Hall sensors. Furthermore, the protective device is independent of the type of supply of deactivation switch 1. It is also independent of whether the hardware path analyzes only one Hall sensor and/or one resistor network, or two or multiple Hall sensors and/or resistor networks. It may furthermore be independent of the type of restraining arrangement to be deactivated. An exemplary embodiment of the present invention may also be independent of the type of deactivation of the restraining means, i.e., whether it is a question of switching on and off the supply voltage of the respective triggering circuit IC's, or switching on and off the trigger voltage supply, or interrupting the triggering circuits, or shorting the triggering circuits, or intervening in the logic control of the triggering circuits. The present invention is also independent of whether the position of deactivation switch 1 is input in the software part via a separate IC or directly by the microcontroller, i.e., there is an A/D converter in the microcontroller itself. The order of blocks 10 and 11 may also be exchanged.

Figure 2:
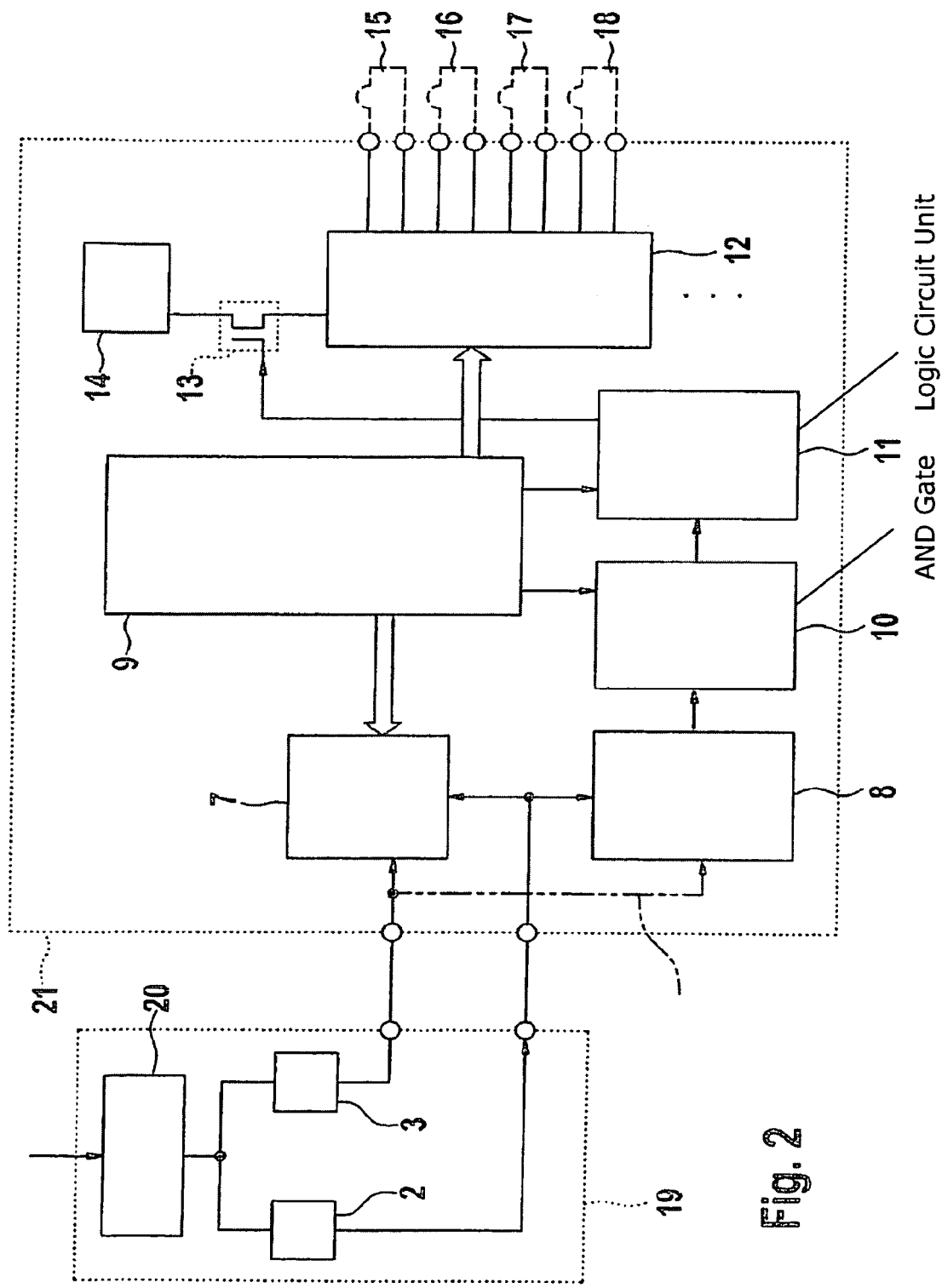
FIG. 2 shows a second block diagram of the protective device according to an exemplary embodiment of the present invention.

FIG. 2 shows a second block diagram of the protective device according to an exemplary embodiment of the present invention. Except for the power supply of deactivation switch 19, deactivation switch 19 and control unit 21 have the same elements. A current limiting unit 20 or fuse is arranged directly at deactivation switch 19, thereby externally supplying the deactivation switch. The other elements are arranged and indicated exactly as in FIG. 1.

What is claimed is:

1. A protective device for a vehicle, comprising:
a switch to deactivate the protective device;
a processor; and
an additional module having at least one logic module, wherein a switch position is verifiable by the processor and by the additional module independently from one another.

2. The protective device of claim 1, wherein the at least one logic module includes at least one of a gate and a flip-flop.

3. The protective device of claim 1, wherein the logic module is configured so that a time response of a logic state of the logic module is modifiable.

4. The protective device of claim 3, wherein the processor modifies the time response.

5. The protective device of claim 1, wherein the switch includes a resistor network.

6. The protective device of claim 1, wherein the switch includes at least one Hall-effect sensor.

7. The protective device of claim 1, further comprising:
a control unit to power the switch.

8. The protective device of claim 1, wherein the switch is powered from an external supply.

9. The protective device of claim 1, wherein the logic state of the logic module is allowed to be retained.

10. The protective device of claim 1, further comprising:
a triggering circuit control; and
an AND gate connctible to the triggering circuit control, wherein the module and the procesor are connected to the AND gate.

\* \* \* \* \*